Figure 1:
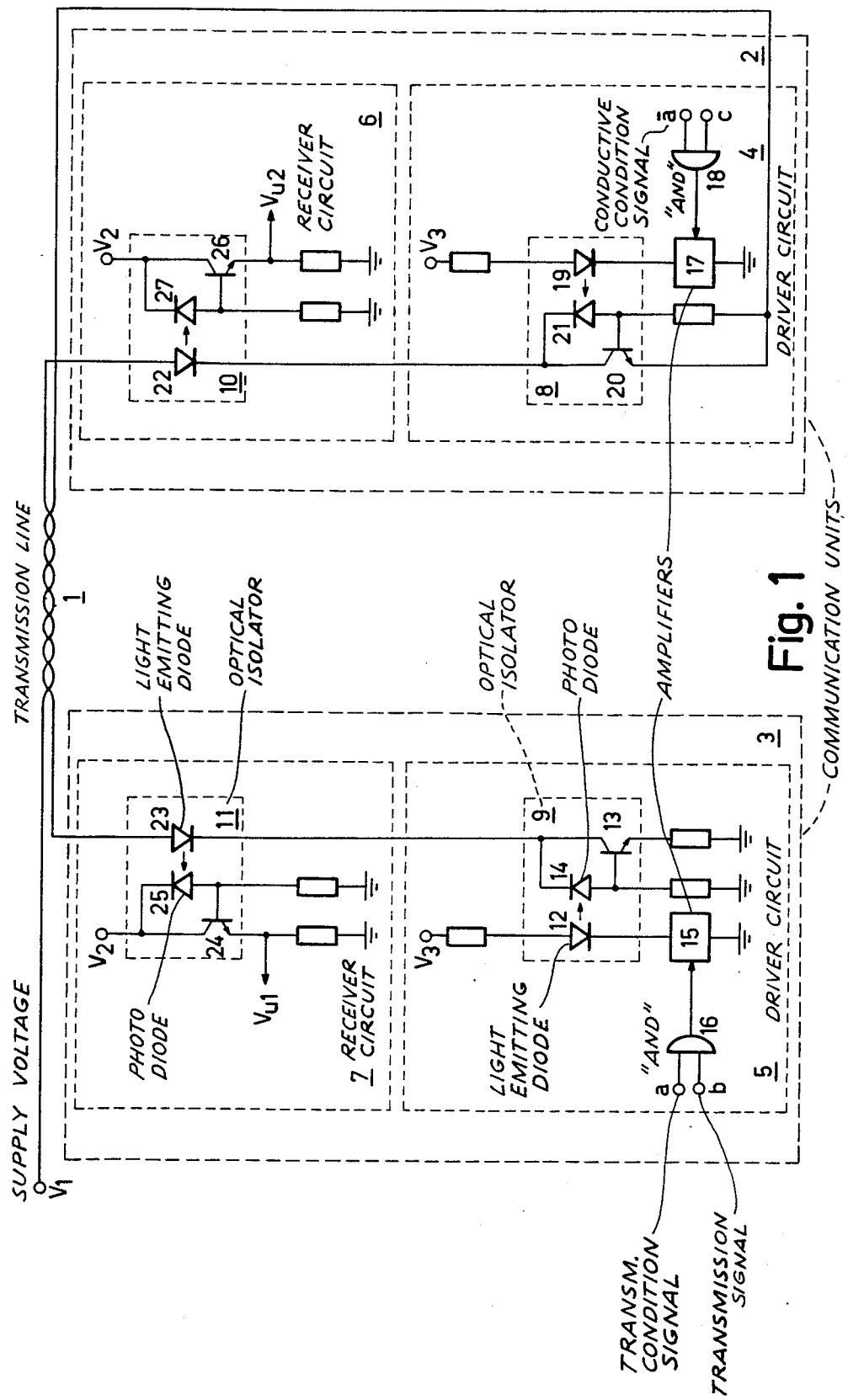

455-607　　　AU 233　　　EX
FIP8106　　　XR　3,970,784

United States Patent [19]
Meijerink

[11] 3,970,784
[45] July 20, 1976

[54] TRANSMISSION SYSTEM

[75] Inventor: Hermanus Martinus Meijerink, Haaksbergen, Netherlands

[73] Assignee: Hollandse Signaalapparaten B.V., Hengelo, Netherlands

[22] Filed: Apr. 18, 1974

[21] Appl. No.: 461,871

[30] Foreign Application Priority Data
May 3, 1973 Netherlands.................... 7306137

[52] U.S. Cl.................. 178/58 A; 250/199; 250/551
[51] Int. Cl.² .......................... H04L 25/02
[58] Field of Search............... 250/199, 551, 217; 340/416, 147 R; 307/311; 178/58 R, 58 A, 61

[56] References Cited
UNITED STATES PATENTS
2,383,788　8/1945　Hanley.............................. 178/58 A
3,808,366　4/1974　Wanamaker et al............ 250/199 X Primary Examiner—Benedict V. Safourek
Attorney, Agent, or Firm—Frank R. Trifari; George B. Berka

[57] ABSTRACT

Transmission system provided with two communication units in a closed electric circuit, each unit consisting of a driver circuit and a receiver circuit each provided with optically coupled isolators to secure said system from the disadvantageous influences due to a common-mode voltage between said units.

4 Claims, 4 Drawing Figures

TRANSMISSION SYSTEM

The invention relates to a transmission system which is provided with two communication units, included in a closed electric circuit, the first unit comprising at least a driver circuit and the second unit at least a receiver circuit.

Various embodiments of such a transmission system are known. In all of these embodiments it may, however, occur that a high common-mode voltage (the difference between the voltages existing at similar reference terminals of two different electronic units) is impressed between the drive circuit and the receiver circuit. This causes an excessively high voltage across various elements of the transmission system, and results in incorrect signal transmission and thus signal distortion, which is to be regarded as a disadvantage of such a transmission system. The usual practice is to eliminate this disadvantage by the insertion of one or several isolating transformers in one of the two communication units. However, this carries the disadvantage that the use of a transmission system thus designed is very limited in view of the poor transfer characteristic of such an isolating transformer. In addition, the application of an isolating transformer in such a transmission system is undesirable if several driver and receiver circuits, also containing isolating transformers, are incorporated in the same closed circuit, as undesired coupling may occur through the transformers.

It is an object of the present invention to provide a solution to the problems arising with the presence of the above-mentioned common-mode voltage, while proper transmission of the signal voltages is ensured and undesired couplings in the driver and receiver circuits are avoided.

According to the invention, at least one of the driver and receiver circuits is provided with a combination consisting of a light-emitting unit and a photo-receptor unit. In case this combination is incorporated in the driver unit, the photo-receptor unit is contained in the closed circuit mentioned above. In case the combination is incorporated in the receiver circuit, the light-emitting unit is contained in the closed circuit.

The invention will now be described with reference to the accompanying FIGS. 1, 2, 3 and 4, which illustrate various embodiments of a transmission system according to the invention.

Figure 2:
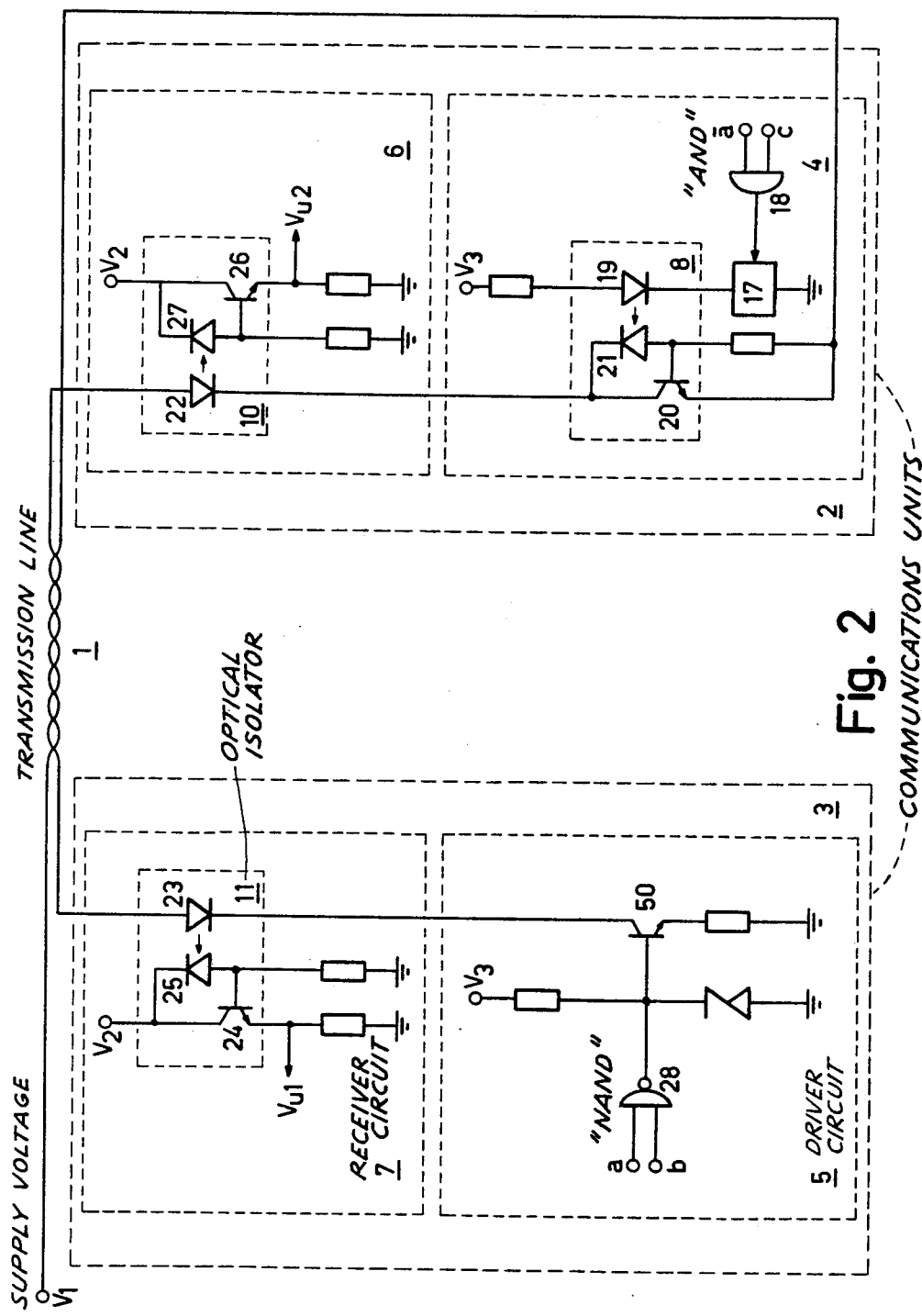
Figure 3:
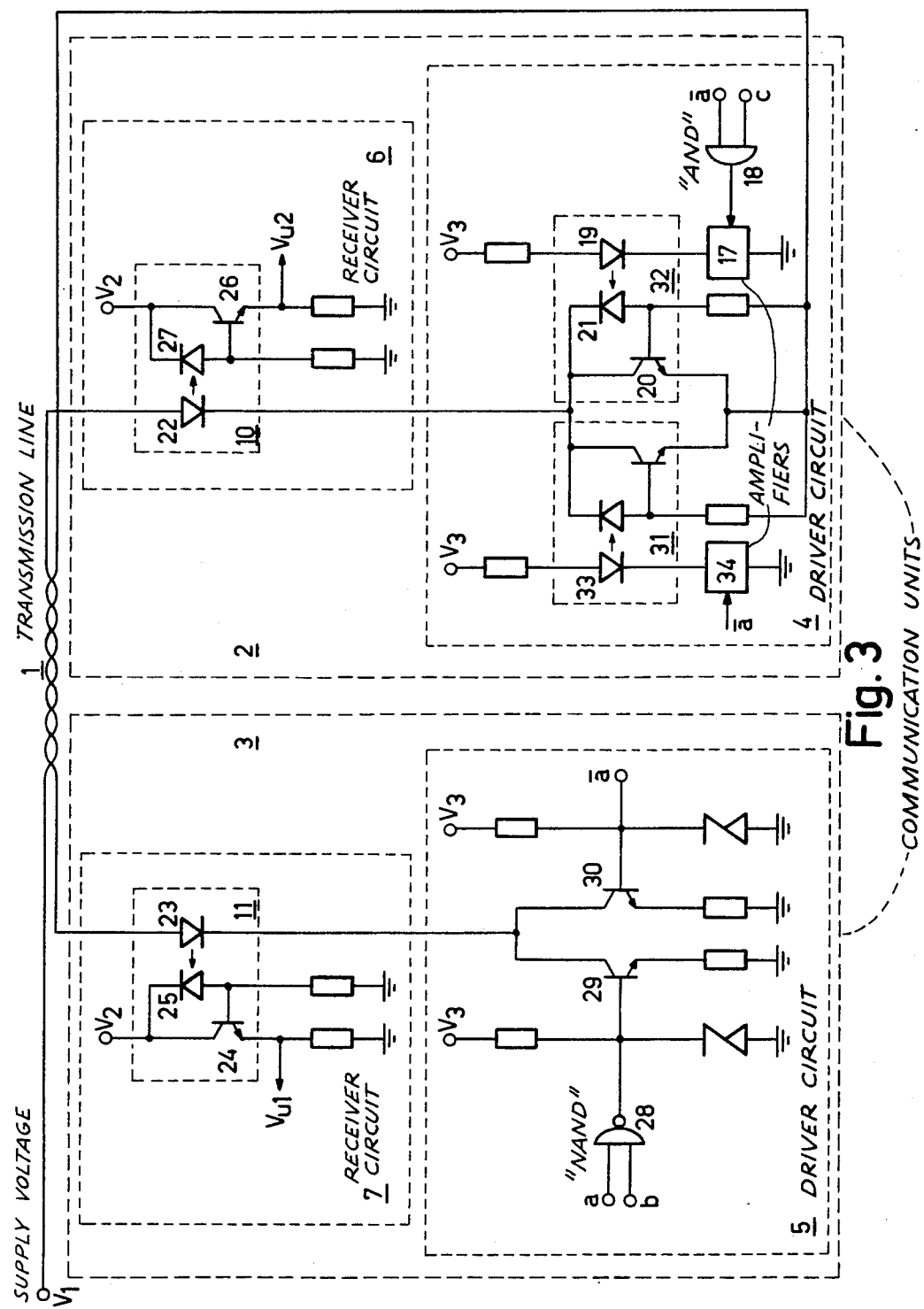
Figure 4:
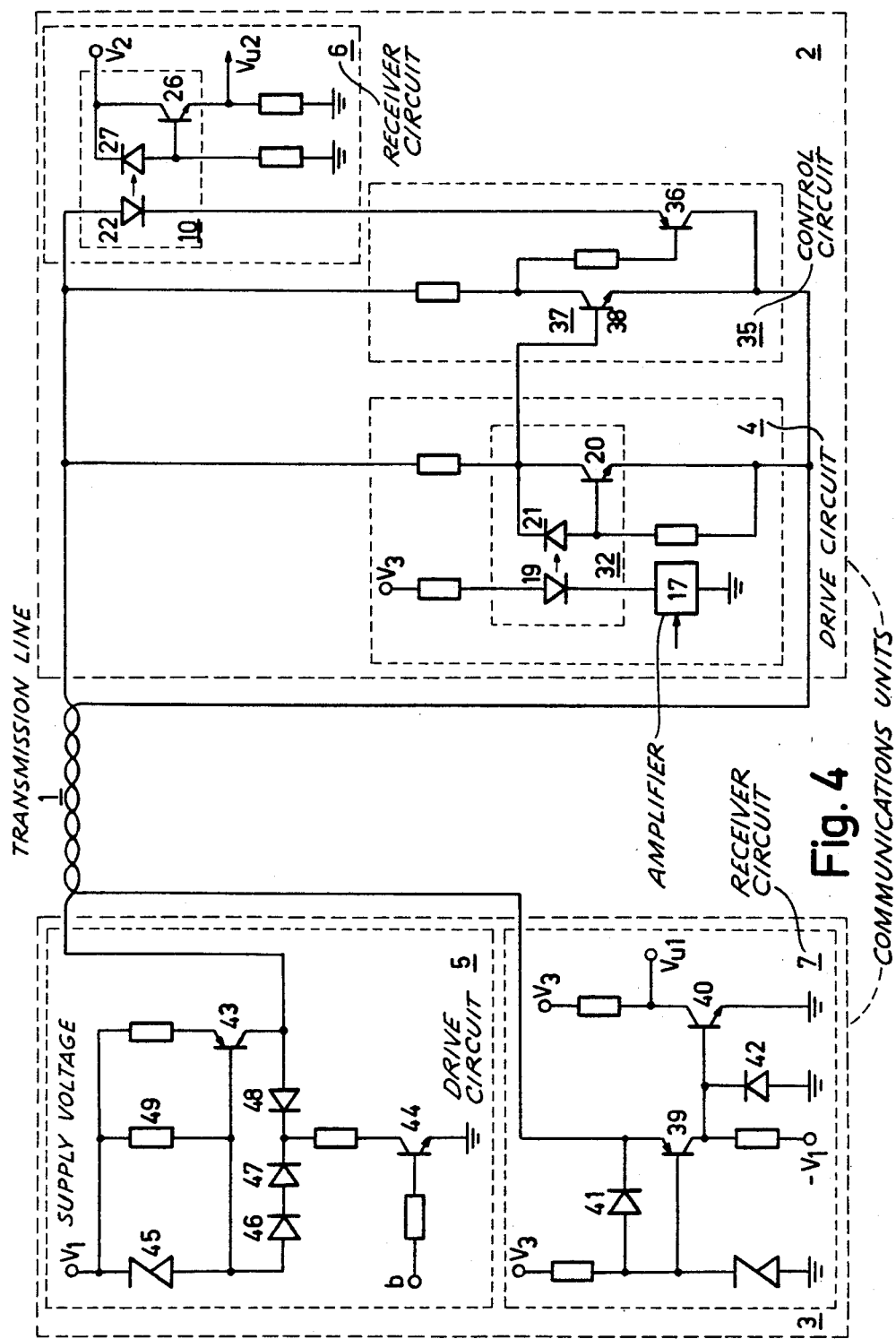

If in the embodiments of FIGS. 2, 3 and 4 any parts of a transmission system are not further discussed, an analogous explanation as given by the embodiment of FIG. 1 applies.

FIG. 1 illustrates a diagram of a transmission system which comprises a closed electric circuit 1, connected to a supply voltage $V_1$. This circuit contains two communication units 2 and 3, each consisting of a driver circuit 4 and 5, and a receiver circuit 6 and 7, respectively. In the embodiment of FIG. 1, driver circuits 4 and 5 and receiver circuits 6 and 7 each contain an optically operating switching system 8, 9, 10 and 11, respectively, forming an optically coupled isolator. The operation of an optically coupled isolator, as well as further details thereof, will be described with reference to switching system 9 of driver circuit 5. The optically coupled isolator of switching system 9 may be regarded as an equivalent of a combination of a light-emitting diode (LED) 12 and a single transistor circuit. The transistor circuit is provided with a transistor 13, which contains a photodiode 14 in its base circuit. If a potential difference is impressed across light-emitting diode 12, a part of its electric energy then is converted into light energy. A part of this light energy is absorbed by photodiode 14, causing transistor 13 to become conductive. One of the characteristic properties of an optically coupled isolator is the current transfer ratio $I_c/I_f$, where $I_c$ is the collector current through transistor 13 and $I_f$ the current through the light-emitting diode 12. Therefore, this current transfer ratio can be regarded as a product of a transfer ratio $I_d/I_f$ between photodiode 14 and light-emitting diode 12, where $I_d$ is the current through photodiode 14, and a transfer ratio $I_c/I_d$, corresponding with transistor parameter $h_{fe}$ of transistor 13. If, for example, communication unit 3 is to fulfil the drive function, the transmission signals $b$ must be supplied to driver circuit 5. For this purpose, circuit 5 contains, in addition to switching system 9, also a drive amplifier 15 and an AND gate 16. For the drive function of driver circuit 5 the AND gate 16 is supplied with a binary-coded condition signal $a$, as well as the transmission signals. Depending on the value of the binary-coded signals $b$, light-emitting diode 12 is either made conducting or non-conducting with the aid of drive amplifier 15. In this way the fluctuations present in transmission signals $b$ are obtained in the current of closed circuit 1, using transistor 13. To this effect, any other transistors of closed circuit 1 must, however, be conducting. This is applicable only to driver circuit 4 in FIG. 1. Driver circuit 4 is identical to driver circuit 5 and is thereto provided with a drive amplifier 17 and an AND gate 18, in addition to switching system 8, which also contains a light-emitting diode 19 and a circuit containing a transistor 20 and a photodiode 21. The desired conducting state of transistor 20 is obtained by the supply of a binary-coded condition signal of binary value 0 to AND gate 18. To obtain such a condition signal, the inverse of condition signal $a$ is used in the embodiment in question. In the two receiver circuits 6 and 7, only light-emitting diodes 22 and 23 are incorporated in closed circuit 1. In switching system 11 a replica of the transmission signals sent to closed circuit 1 is obtained with the aid of light-emitting diode 23. Switching system 11 also contains a transistor 24 and a photodiode 25. Output voltage $V_{u1}$ derived from switching system 11 provides a means to check the information signal transmitted to closed circuit 1. The design of receiver circuit 6 of communication unit 2 is similar to that of receiver circuit 7. Therefore, switching system 10 incorporates light-emitting diode 22 and also a circuit containing a transistor 26 and a photodiode 27. Output signal $V_{u2}$, obtained through transistor 26, is therefore similar to output signal $V_{u1}$. In this way the transmission of signals from communication unit 3 to communication unit 2 is realized. Because of the completely symmetrical design of the two communication units 2 and 3, it can easily be seen that information from communication unit 2 to communication unit 3 can be transmitted in a similar way; however, the binary value of the condition signals must then be changed.

It may occur that a transmission system as described above does not function as required. This may, for example, be consequence of the unequal value of the current transfer ratio of the optically coupled isolator in driver circuit 5 with respect to the optically coupled isolator in driver circuit 4. If, for instance the transfer ratio of the optically coupled isolator of driver circuit 4 is greater than that of driver circuit 5 with equal current flowing through the respective light-emitting diodes 19 and 12, the collector current of transistor 20 would also be greater than that of transistor 13; however, this is utterly impossible, as the two transistors 20 and 13 are connected in series in the same closed circuit 1. The optically coupled isolator of driver circuit 4 will, in such a case, be driven to saturation, as a consequence of the fact that, on changing the current flow in light-emitting diode 19, the magnitude of the collector current in transistor 20 remains unchanged. This infers to a relatively low impedance of driver circuit 4.

This is a different matter in the case of the optically coupled isolator in driver circuit 5; when the current flow through light-emitting diode 12 changes, there will be a change in the collector current of transistor 13, as the collector current of transistor 20 in driver circuit 4 may assume a larger value with the given current flow through light-emitting diode 19. This infers that the optically coupled isolator of driver circuit 5 is not driven to saturation, the effect being that driver circuit 5 has a relatively high impedance. If communication unit 3 fulfills the drive function, the impedance of the collector-emitter circuit of transistor 13 is determined by the impedance of driver circuit 4; the latter impedance is rather low, resulting in a uniform current characteristic of transistor 13. If, however, communication unit 2 fulfills the drive function, the impedance of the collector-emitter circuit of transistor 20 is determined by the impedance of driver circuit 5, which is relatively high. Therefore, the current characteristic of transistor 20 is not uniform in time. It is therefore desirable to choose a relatively low value for the impedance of the collector-emitter circuit of the transistor (20 or 13) fulfilling the drive function. Besides, if the two driver circuits 4 and 5 are required to fulfill the drive function alternately, the best solution is obtained by selecting the optically coupled isolators in driver circuits 4 and 5 in such a way that the current transfer ratios of these isolators are of equal value. If this cannot be realized, owing to a large spread in these current transfer ratios, driver circuits 4 and 5 may be provided with adjusting resistors, enabling the collector current in each of the transistors 13 and 20 to be set to the same value.

It is also possible to design a transmission system according to the invention, in which system only one of the driver circuits 4 and 5 is provided with an optically coupled isolator, and the other circuit with a normal transistor circuit. Such a design has the advantage that, depending on the properties of the driver circuit provided with an optically coupled isolator, a matched type of transistor can be applied in the other driver circuit, whereby especially the little spread in the properties of a transistor emerges with respect to that in an optically coupled isolator. Such a design is shown in FIG. 2, in which both transmitter circuit 4 and receiver circuit 6 of communication unit 2 are provided with an optically coupled isolator, in order to be able to deal with the problems encountered with the presence of a common-mode voltage.

In principle, the other communication unit, viz. unit 3, does not require an optically coupled ioslator. Nevertheless, receiver circuit 7 contains an optically coupled isolator, as such an isolator is capable to fullfill the active function of a transmission element, in addition to the passive function of a diode. The passive function of a diode is favorable here, as this diode is made conductive automatically, thus without additional means, when transmitting signals are transmitted from driver circuit 5 to receiver circuit 6. In addition to this, the active function of light-emitting diode 23 as transmission element is desirable if communication unit 3 fulfills the receiver function and if receiver circuit 7 performs a checking function while communication unit 3 is fulfilling the driver function.

For the drive function of communication unit 3 the driver circuit 5 must be made active. In the embodiment in question this occurs by the application of condition signal $a$ and transmission signals $b$ through NAND gate 28 driving a transistor circuit 50. If communication unit 3 is assigned for the driver function, and, therefore, communication unit 2 for the receiver function, condition signal $a$ is of binary value 1. This results in a replica of the driver signals $b$ in output voltage $V_{u1}$ of receiver circuit 6. Under these conditions receiver circuit 7 behaves as a passive element, while driver circuit 4 is continually conducting through condition signal $\bar{a}$. A transmission system as described above operates satisfactorily, provided the total length of closed circuit 1 is less than 20 m. If the total length of closed circuit 1 is considerably greater than 20 m, disturbing reflections will occur. The cause of these reflections must be attributed to the incorrect termination of the closed circuit on account of excessively high impedances.

Such a problem will not be encountered in a transmission system according to the invention, where during the receive mode of the communication unit (2 or 3) the respective driver circuit (4 or 5) represents a higher impedance than during the drive mode of said unit (2 or 3).

Such a transmission system can be realized in at least four embodiments, of which only two will be described with reference to FIGS. 3 and 4.

In one of these four embodiments the current through a light-emitting diode (12 or 19, see FIG. 1) is made conditional on the function assigned to the respective communication unit 3 or 2. If, for example, communication unit 3 is in the receive mode, the current through light-emitting diode 12 of the corresponding driver circuit 5 is increased by means of switching and/or amplifying units, in order to set the relevant collector current to a higher level. This will cause a decrease of the impedance of the collector-emitter circuit of transistor 20 in driver circuit 4.

In another of the four embodiments the base bias of transistors 20 and 13 in driver circuits 4 and 5, respectively, depends on the state assumed by the relevant communication units 2 and 3 such that during the drive mode of the communication unit (2 or 3) a driver circuit (4 or 5) represents a higher impedance in the closed circuit 1 than during the receive mode of the communication unit (2 or 3). Such a bias setting is obtained through switch and/or amplifier units in the base circuit of each of the transistors in driver circuits 4 and 5. Due allowance should however be made for the common-mode voltage, which may be an influencing factor in the above switch and/or amplifier units.

In still another of the four embodiments (see FIG. 3) each of the driver circuits 4 and 5 is of dual design, whereby only a single design is active during the period the relevant communication unit (2 or 3) is in the drive mode. Therefore, the dual design is active only during the receive mode of the respective communication unit (2 or 3). This design of a transmission system will now be described with reference to FIG. 3.

Driver circuit 5 comprises two parallel-connected transistor circuits 29 and 30, of which circuit 29 is continuously active and circuit 30 only when driver circuit 5 is in the receive mode. Such a mode of driver circuit 5 is realized by driving the circuit 30 with condition signal $\bar{a}$, which assumes the binary values 0 and 1, when communication unit 3 is in the drive and the receive modes respectively. Similarly, driver circuit 4 is provided with two parallel-operating switching systems containing optically coupled isolators 31 and 32. Optically coupled isolator 31 is active only when light-emitting diode 33 is conducting. This is realized by the insertion of a drive amplifier 34 in the circuit of light-emitting diode 33. This amplifier receives the condition signal $\bar{a}$.

In the last of the four embodiments (see FIG. 4), the closed circuit 1 comprises, in addition to driver circuit 4 and the receiver circuit 6, also a control circuit 35, within communication unit 2. Receiver circuit 6 and control circuit 35 are connected in series, while driver circuit 4 is parallel connected to this series circuit. Control circuit 35 is used to render receiver circuit 6 inactive. For this purpose the control circuit in this embodiment comprises a power transistor 36 receiving its input signal from a drive amplifier 37 which incorporates transistor 38. In this embodiment the control voltages required for control circuit 35 and thus for drive amplifier 37 are derived from driver circuit 4, viz, from the transistor circuit with transistor 20. This eliminates any problems in respect of a common-mode voltage, if present. The receiver circuit 7 in this embodiment is not provided with an optically coupled isolator, as in the aforementioned embodiments, but with a transistor circuit incorporating transistor 39, of which the base is kept at the fixed positive voltage ($V_Z$) of a zener diode.

When transistor 39 is conducting, the emitter is at a potential of $V_Z+V_{BE1}$, where $V_{BE1}$ is the emitter-base voltage of transistor 39. Due to the small variation of $V_Z$ and $V_{BE1}$, $V_Z+V_{BE1}$ may be regarded constant. Receiver circuit 7 also contains a second transistor circuit incorporating transistor 40. By connecting the emitter of transistor 40 to earth and the base of this transistor to the collector of transistor 39, the collector potential of transistor 39 will have the same value as the base potential of transistor 40, which potential may be assumed constant. Hence, there is a fixed difference in voltage between the collector and the emitter of transistor 39; this difference is equal to $V_Z+V_{BE1}-V_{BE2}$, where $V_{BE2}$ is the emitter-base voltage of transistor 40.

When transistor 39 is conducting, transistor 40 will also be conducting, so that output voltage $V_{u1}$ of receiver circuit 7 will be low.

On the other hand, with no current flowing in closed circuit 1, the emitter-base voltage of transistor 39 is equal to voltage $V_d$ across diode 41 between the emitter and the collector of this transistor. The collector potential of transistor 39 would then assume the value of the negative potential of the voltage source for the transmission system, were it not for the fact that the collector potential is kept at a fixed value $(-V_d)$ through a diode 42 connected between earth and the collector of transistor 39. This fixed value is also the potential for the base of transistor 40. On the application of this potential, transistor 40 is cut off, thus making $V_{u1}$ high.

As concerns driver circuits 4 and 5, only circuit 5 deserves further consideration. Driver circuit 5 comprises two transistor circuits, of which the circuit containing transistor 43 functions as a power source, while the other circuit provided with transistor 44 acts as a switch in the return line of the power source. The drive signals to closed circuit 1 are passed via the base of transistor 44. If, owing to the applied drive signals, a high voltage is impressed between the base and the emitter of transistor 44, transistor 43 starts conducting, and a current will flow from the positive pole of voltage source $V_1$ to transistor 44. At least a zener diode 45 and two diodes 46 and 47, are successively inserted between voltage source $V_1$ and transistor 44. Since the base of transistor 43 is connected to the positive side of diode 46, transistor 43 starts conducting when diodes 45, 46 and 47 are conducting. As also a diode 48 is included between the collector of transistor 43 and the negative side of diode 47, it is ensured that the base-collector voltage assumes a maximum value equal to the voltage $V_d$ across diode 46 or 47. Thus the collector-emitter voltage is equal to the sum of the small, constant base-emitter voltage and the diode voltage. Hence, transistor 43 will not be driven to saturation. It remains to be said that if the base-emitter voltage of transistor 44 becomes low due to the applied signals, this transistor will be cut off. The base-emitter voltage of transistor 43 then becomes zero, because of resistor 49 between the base of this transistor and the supply voltage. The result is that transistor 43 will be cut off.

Furthermore, the above shows that if one of the drive circuits (4 or 5) is switched to the drive mode, the other drive circuit (5 or 4) starts conducting. This implies that, when the drive signals are applied to drive circuit 5, the circuit containing light-emitting diode 19 and current amplifier 17 must not carry any current. Conversely, when driver circuit 4 receives the drive signals, transistor 39 must be made conducting; this means that the base potential of transistor 40 must be increased.

What we claim is:

1. A transmission system comprising: a transmission line; a unidirectional power supply and two communication units connected in series with said transmission line; each unit including a driver circuit and a receiver circuit; at least one driver circuit including a photosensitive electronic device connected in the transmission line and a light emitting electronic device optically coupled to said photosensitive device; at least one receiver circuit including a light emitting electronic device connected in the transmission line; and control means coupled to each driving circuit for controlling conductive condition of the photosensitive device in said one driving circuit and for maintaining conductive condition in the other driving circuit.

2. A transmission system as claimed in claim 1 wherein the control means in said one driving circuit controls the light emission of the associated light emitting device.

3. A transmission system as claimed in claim 2 wherein said control means includes first gating means coupled to said one driving means and activated by the transmission signal and by a binary control signal and second gating means coupled to the other driving means and activated by an inverse binary control signal.

4. A transmission system as claimed in claim 1 wherein each receiver circuit and each driver circuit includes a photosensitive device optically coupled to said light emitting device.

* * * * *